United States Patent
Richter

(10) Patent No.: US 6,308,830 B1
(45) Date of Patent: Oct. 30, 2001

(54) DEVICE FOR PROTECTING LARGE-VOLUME RECEPTACLE AND METHOD FOR THE PRODUCTION THEREOF

(75) Inventor: Günter Richter, Altenkirchen (DE)

(73) Assignee: Greif Bros. Corporation, Delaware, OH (US)

( * ) Notice: Subject to any disclaimer, the term of this patent is extended or adjusted under 35 U.S.C. 154(b) by 0 days.

(21) Appl. No.: 09/341,410

(22) PCT Filed: Jul. 16, 1998

(86) PCT No.: PCT/DE98/00058

§ 371 Date: Jul. 9, 1999

§ 102(e) Date: Jul. 9, 1999

(87) PCT Pub. No.: WO98/30466

PCT Pub. Date: Jul. 16, 1998

(30) Foreign Application Priority Data

Jan. 11, 1997 (DE) .............................................. 197 00 781

(51) Int. Cl.$^7$ ............................. B65D 19/04; B65D 77/06
(52) U.S. Cl. .................... 206/386; 206/523; 220/620.15; 156/244.11
(58) Field of Search .................................... 206/386, 595, 206/596, 598, 599, 600, 521, 523, 524; 108/55.1, 55.3, 57.12, 57.34; 220/1.5, 4.12, 4.13, 62.15, 62.22; 264/241, 239; 156/242, 244.11

(56) References Cited

U.S. PATENT DOCUMENTS

| | | | |
|---|---|---|---|
| 2,952,379 | * | 9/1960 | Potter ..................................... 220/1.5 |
| 3,968,895 | * | 7/1976 | Barnes, Jr. et al. .................. 220/1.5 |
| 4,801,347 | * | 1/1989 | Garwood ........................... 156/244.11 |
| 4,809,851 | * | 3/1989 | Oestreich, Jr. et al. ............. 206/600 |
| 5,058,746 | * | 10/1991 | Morgan, IV ......................... 206/598 |
| 5,180,076 | * | 1/1993 | Hundt ..................................... 220/1.5 |
| 5,373,958 | | 12/1994 | Bokmiller . |
| 5,490,603 | | 2/1996 | Davis . |
| 5,743,986 | * | 4/1998 | Colombo .......................... 156/244.11 |
| 5,829,595 | * | 11/1998 | Brown et al. ........................ 206/600 |
| 6,036,007 | * | 3/2000 | Alejandro et al. ................... 206/523 |

FOREIGN PATENT DOCUMENTS

| | | |
|---|---|---|
| 2638238 | 3/1978 | (DE) . |
| 297 00 436 U1 | 9/1997 | (DE) . |

* cited by examiner

*Primary Examiner*—Luan K. Bui
(74) *Attorney, Agent, or Firm*—Friedrich Kueffner

(57) ABSTRACT

A device for protecting a large-volume container for liquid, slow-flowing, powdered, or granular materials during storage and transport, has a pallet support body to support the container from underneath and a jacket body, which is connected to the pallet support body and which surrounds the sides of the container. The support body and the jacket body are made as an integral unit consisting of a three-layer plastic wall. The three-layer plastic wall has a compact outer layer, a compact inner layer, and a foamed intermediate layer. The device is produced by extruding a predetermined length of a tubular preform with a three-layer wall of plastic into an opened mold. Several vertical, rod-shaped spreading elements are positioned inside the tubular preform. The tubular preform is expanded by moving the spreading elements in a radially outward direction relative to the tubular preform by a predetermined outward movement. A mold core is introduced from below into the expanded tubular preform and the opened mold is closed to form a mold cavity between the mold and the mold core so that the tubular preform is positioned in the mold cavity. The inner layer of the three-layer wall is then foamed to bring the compact inner layer and the compact outer layer into contact with the walls of the mold cavity to in order to shape the device.

11 Claims, 6 Drawing Sheets

DEVICE FOR PROTECTING LARGE-VOLUME RECEPTACLE AND METHOD FOR THE PRODUCTION THEREOF

BACKGROUND OF THE INVENTION

1. Field of the Invention

The invention pertains to a device for protecting a large-volume container during the storage and transport of liquid, slow-flowing, powdered, and granular contents, consisting of a pallet-like support body, which supports the container from underneath, and a jacket body, which is connected to the support body and which surrounds the sides of the container. The invention also pertains to a process for the production of the device.

2. Description of the Related Art

Large-volume containers, the capacities of which are usually in the range of 500–1,000 liters and which are made of plastic by the blow-molding method, are used for the transport and storage of liquid, slow-flowing, powdered, and granular materials. These containers have a closable opening at the top for filling and an opening at the bottom with a shut-off valve for emptying. So that a container of this type can be transported and stored easily and without damage, it is supported, usually by its rectangular base, on a pallet-like support body of wood, metal, or plastic. A jacket body, made of vertical and horizontal bars of metal, welded together, rests on top of the support and surrounds the sides of the container. A metal jacket body is disadvantageous and therefore undesirable in the chemical industry and also in the food product sector. A device consisting of a support body and a jacket body for protecting pallet containers of this type is considered disadvantageous because, first, it is very expensive to produce, and second, because there is always the danger that the jacket body can separate from the support body. The grid-like jacket body, furthermore, cannot completely exclude the risk of damage to the container.

SUMMARY OF THE INVENTION

The invention is therefore based on the task of creating a device for protecting a large-volume container for the transport and storage of liquid, slow-flowing, powdered, and granular materials, which can be produced easily and cheaply, which is almost completely resistant to chemical rusting, and which excludes the danger that the jacket body can separate from the support body. In addition, the device is also intended to have an attractive appearance and to offer better protection to the container.

To accomplish this task, it is proposed according to the invention that, for a device the of general type described above, the support body and jacket body be made as an integral unit of plastic with a three-layer wall, consisting of a compact outer layer, a compact inner layer, and an intermediate layer of foam.

A device designed in this way can be produced relatively quickly and cheaply. It gives the container held within it a very high degree of protection, and it also has a good visual appearance. The danger that the jacket body can separate from the support body is excluded. The weight of a device such as this is relatively low.

Additional features of the device according to the invention and of a process for its production will be come apparent from the following description of preferred embodiments.

BRIEF DESCRIPTION OF THE DRAWING

The invention is explained in greater detail below on the basis of an exemplary embodiment, shown in a drawing:

FIG. 1 shows a front view of a device according to the invention with a container held within in;

DESCRIPTION OF THE PREFERRED EMBODIMENT

Figure 1:
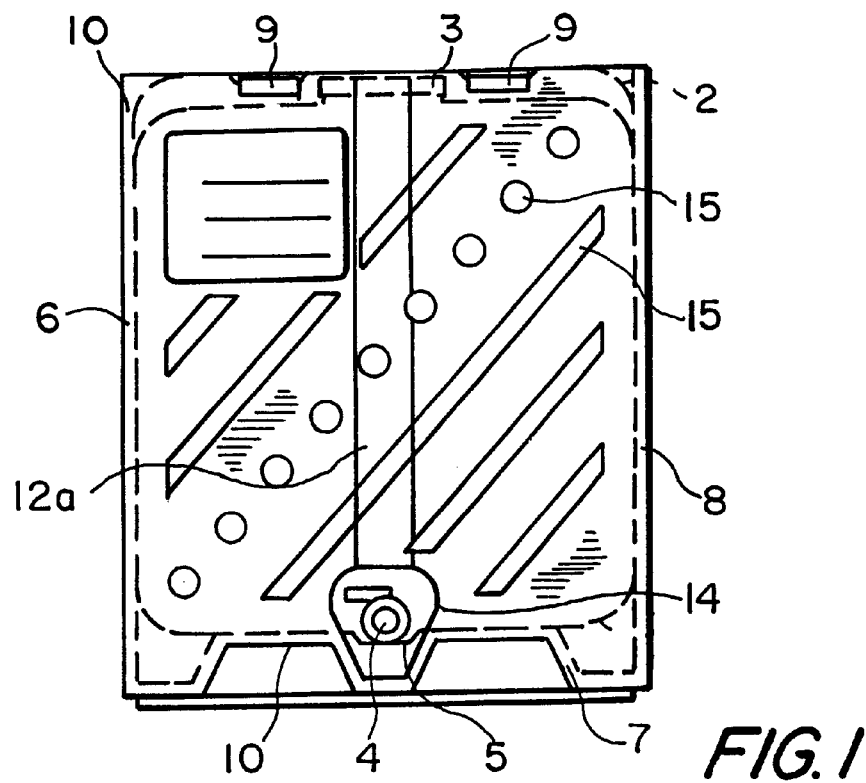

FIG. 1 of the drawing shows a pallet container 1, which consists, first, of a container 2 of plastic, which holds a liquid, slow-flowing, powdered, or granular medium, i.e., the so-called content. Container 2 is provided with a closable opening 3 for filling, merely suggested in the drawing, located in the upper area of container 2. In the lower area, container 2 has an outlet 4, in which a shut-off valve 5 is installed. Container 2 is held in a device 6 according to the invention, which protects it during transport and storage.

Figure 10A:
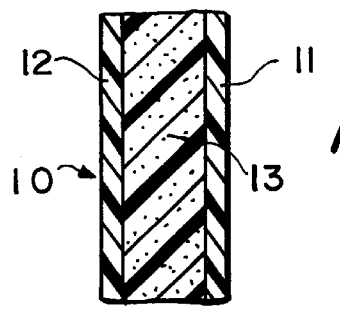
FIG. 10a shows a cross section through the wall of the device of FIG. 1.

This device 6 consists of a pallet-like support body 7, on which container 2 rests. Connected to support body 7 is a jacket body 8, which is made as a single unit with the support body and encloses the sides of container 2. Container 2 is secured in device 6 by means of special cover elements, not shown in FIG. 1 of the drawing, which are held by means of merely suggested clamping straps 9 in the upper area of wall 10 of jacket body 8. Wall 10 of both jacket body 8 and of support body 7 is made up of three layers, one of which is a compact outer layer 11 of colored and usually UV-resistant plastic (FIG. 10a). Wall 10 of jacket body 8 and support body 7 also has an inner layer 12 of plastic, also compact, and located a certain distance away from outer layer 11. This inner layer can be made of, for example, translucent material. Inner layer 12 is separated from outer layer 11 by an intermediate layer 13, which consists of plastic foam. An extremely stable device 6 of relatively low weight is achieved as a result of this intermediate layer 13.

In the exemplary embodiment shown, jacket body 8 has an opening 14, through which shut-off valve 5 projects, so that it is easy to empty container 2. In addition, outside surface of jacket body 2, as indicated in FIG. 1, can be provided with raised or depressed elements 15. Intermediate layer 13 of plastic foam can, if needed, have different densities in different areas; this is easy to accomplish during the production of device 6 or of the preform. It is necessary merely to vary the thickness of the individual layers 11, 12, 13 as they are being extruded. Compact polyethylene and polyethylene provided with a foaming agent can be used as materials for device 6, for example.

Figure 2:
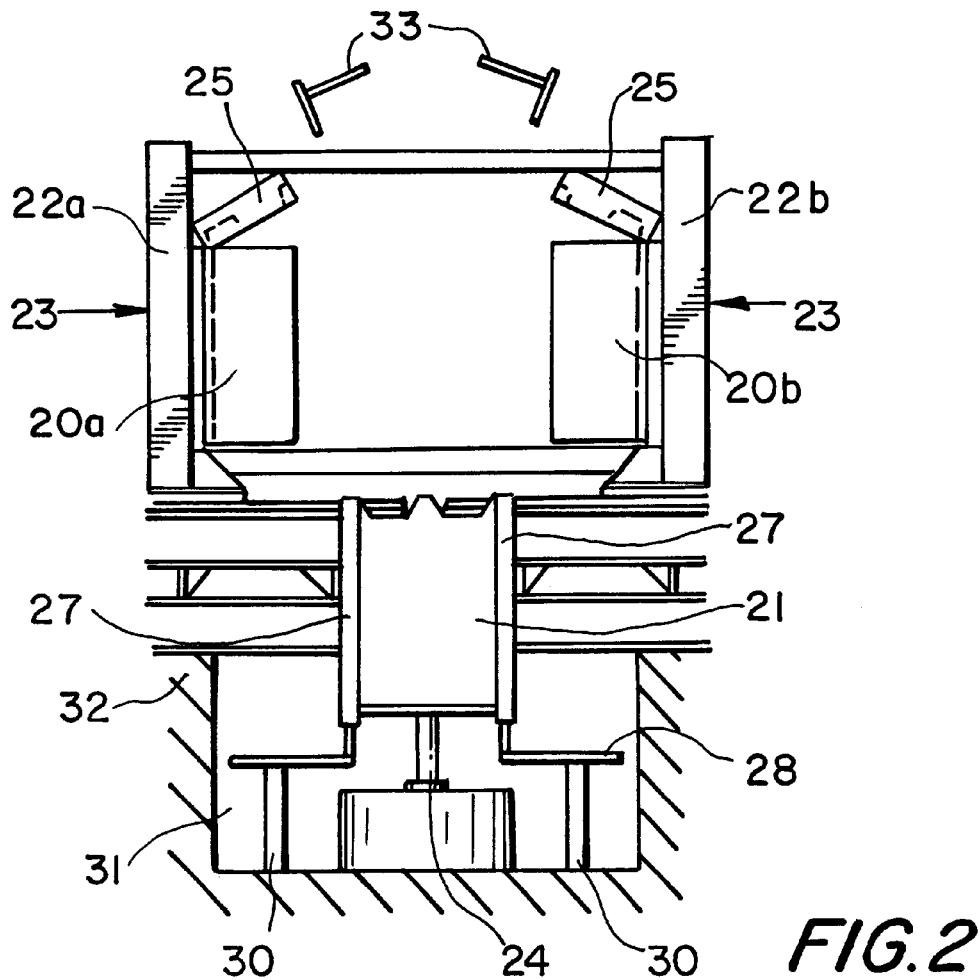
FIGS. 2–9 show a system for the production of the device of FIG. 1 in the individual stages of the process.
Figure 8:
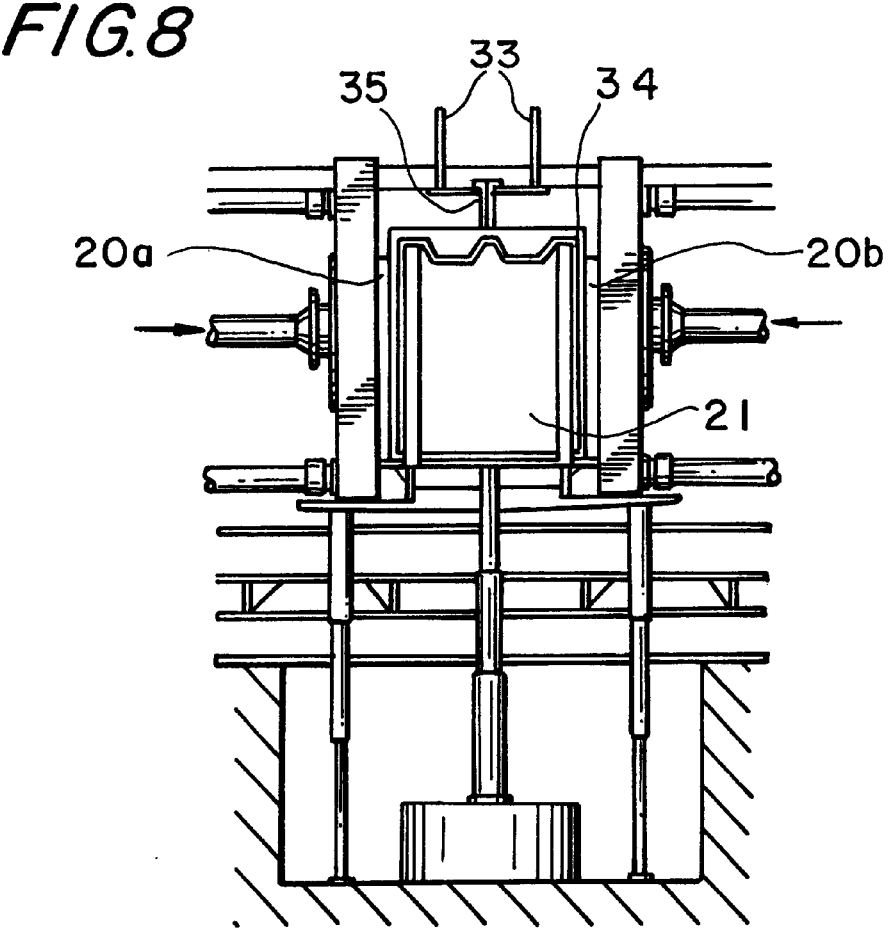
Figure 9:
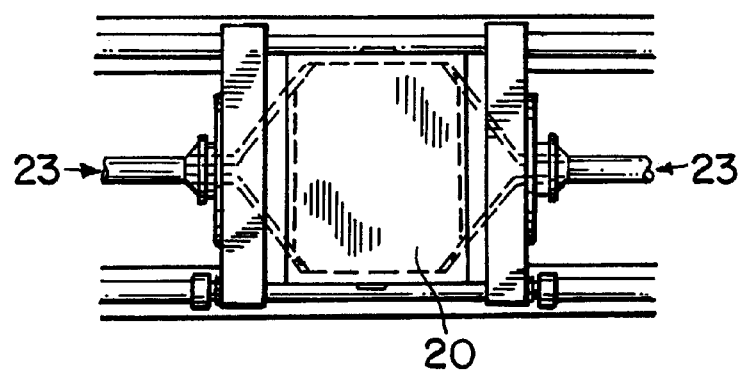

Device 6 explained on the basis of FIG. 1 is produced by a system such as that shown in simplified manner in FIGS. 2–9, which illustrate different operating positions of the system. This system, which is installed below an extruder, consists, first, of a mold 20 (FIG. 9), which is formed out of two mold halves 20a, 20b, and a mold core 21. Each half 20a, 20b of the mold is held by a mold support 22a, 22b, which can be moved or slid by means of a drive (not shown)

in the direction of arrows 23 out of the position according to FIG. 2 into the position shown in FIG. 8. Mold core 21 is located under the plane of motion of mold halves 20a, 20b and can be raised by a drive 24 out of its position in FIG. 2 into the position of FIG. 7.

Each mold half 20a, 20b has a flip-open upper part 25 (FIG. 2) and two flip-open side parts 26 (FIG. 3), which are drawn here in their original or starting positions. By means of drives known in themselves (not shown), both upper parts 25 and side parts 26 can be pivoted into the positions according to FIGS. 8 and 9.

Figure 3:
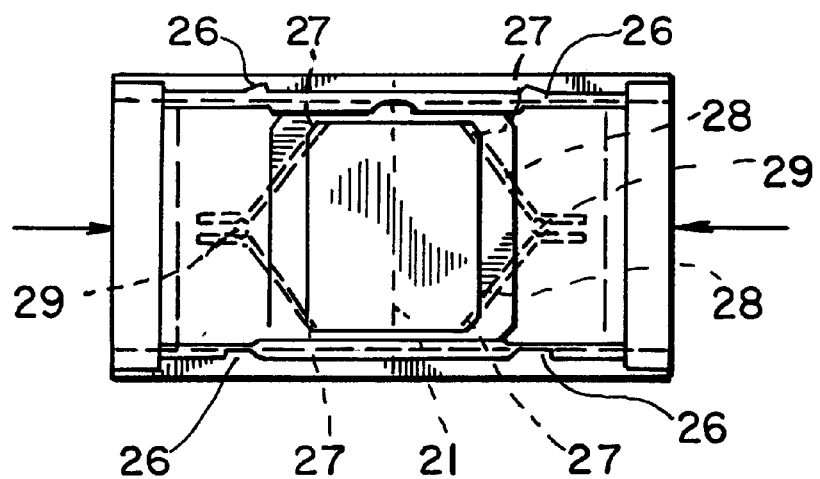

Each of the four corners of mold core 21, which has an approximately rectangular cross section, is provided with a spreading element 27, which supplements the cross section of mold core 21 but which can be moved independently of it. Each spreading element 27 is carried by a pivot lever 28, which can be pivoted below mold core 21 around an axis 29. As can be seen in FIG. 3, each pair of adjacent pivot levers 28 with their spreading elements 27 are assigned to a common pivot axis 29. Drives known in themselves (not shown in the drawing) are assigned to pivot levers 28 to move them and thus to move spreading elements 27. Pivot levers 28 and thus spreading elements 27 can be moved out of their position in FIG. 3 into the position of FIG. 5 and back again. In addition, each axis 29, around which two pivot levers 28 can be pivoted, also has its own lifting drive 30, by which pivot levers 28 and thus spreading elements 27 can be lifted out of their position according to FIG. 2 and into the position according to FIG. 4. Lifting drives 30 and lifting drive 24 are housed in, for example, a recess 31 in a base 32.

Figure 6:
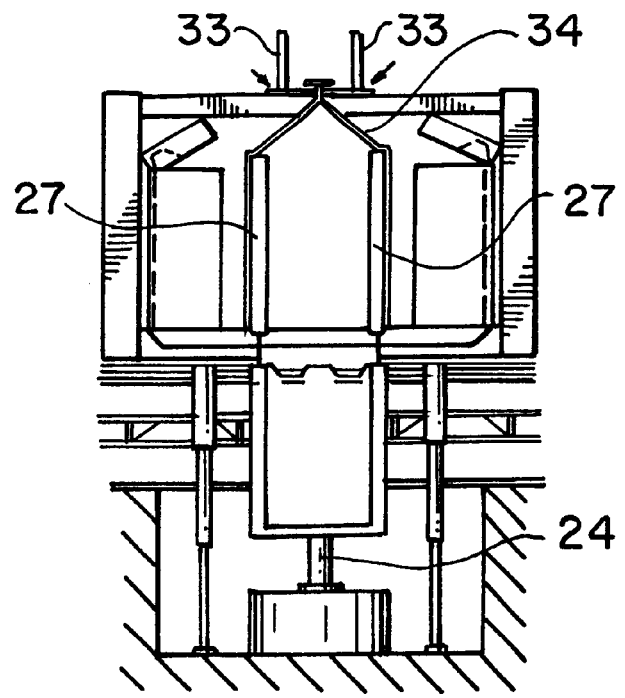
Figure 7:
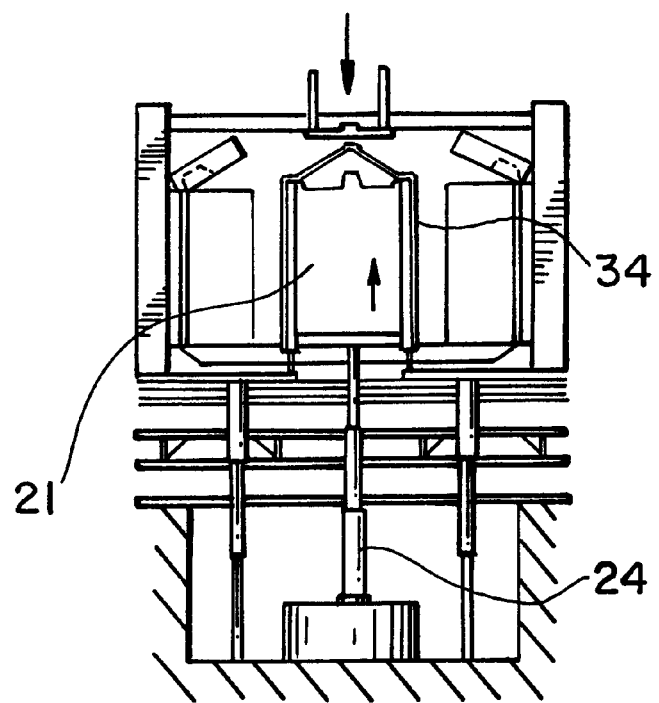

Finally, two clamping elements 33, which can be pivoted by drives (not shown) out of the position according to FIG. 2 into the position according to FIG. 6, are located above mold 20. The pivot axes of these clamping elements 33 are not shown in the drawing.

Figure 1A:
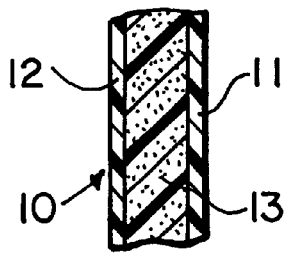
FIG. 1a shows a sectional view of the wall of the device.
Figure 1B:
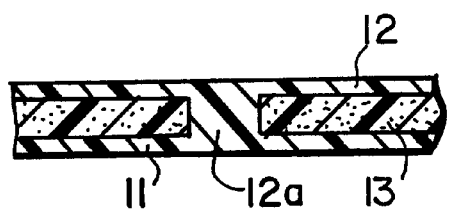
FIG. 1b shows a sectional view of the wall of the device with a viewing strip.
Figure 4:
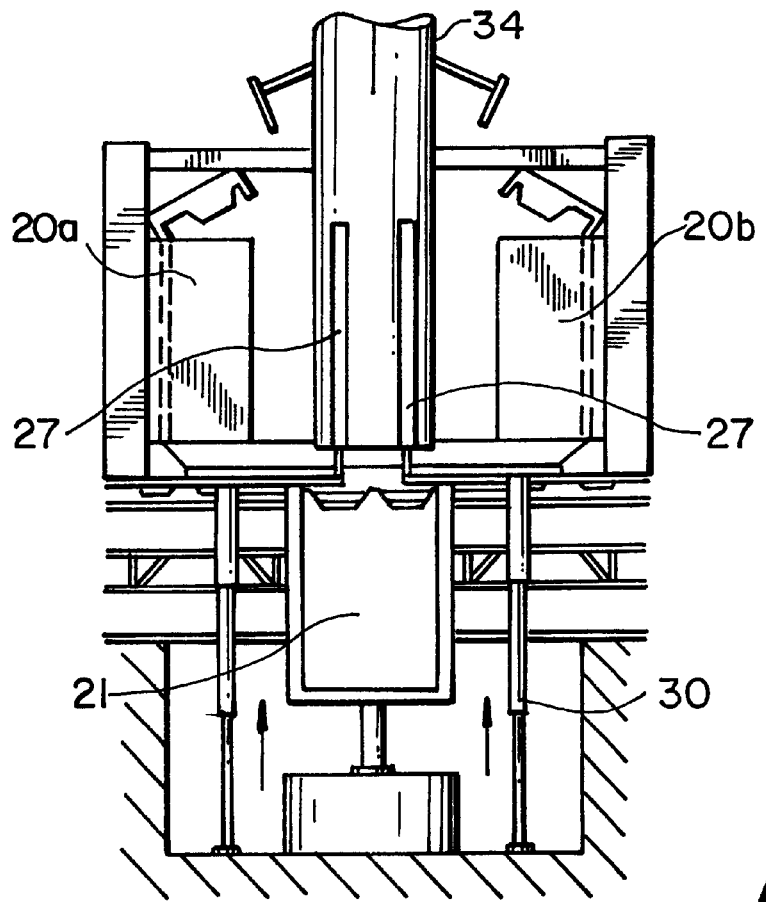
Figure 5:
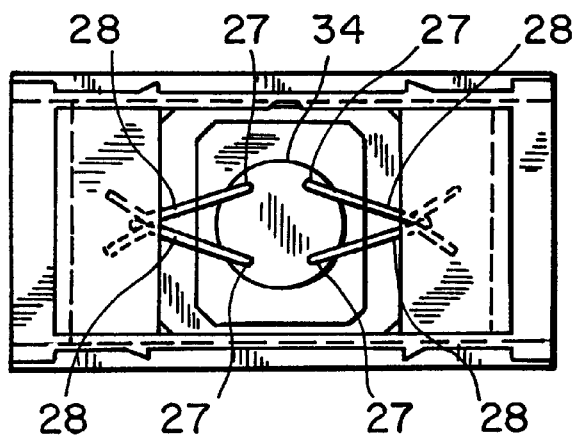

In the production of a device 6 according to the invention, it is now assumed that all parts of the system are in the position shown in FIGS. 2 and 3. Now, first, the four spreading elements 7 are raised by their lifting drives 30 from their position in FIG. 2 until they arrive between the two mold halves 20a, 20b, as can be derived from FIG. 4. This means that spreading elements 27 leave their position on mold core 21, which remains in its lower position (FIG. 4). As soon as pivot levers 28 carrying spreading elements 27 are above mold core 21 at the height shown in FIG. 4, their drives are turned on, and spreading elements 27 are thus pivoted toward each other until they assume the position which can be clearly seen in FIG. 5. Spreading elements 27 are in this position in FIG. 4 of the drawing. Now, a tube-like preform 34 is supplied to the system from above, i.e., from the previously mentioned extruder; in the exemplary embodiment shown, this preform has a circular ring-shaped cross section, as can be seen in FIG. 5. Preform 34 already has a wall 10 consisting of three layers, as has already been explained on the basis of FIG. 1a. Preform 34 therefore already has an outer layer 11 and an inner layer 12 of compact plastic; the types of plastic used for these two layers 11, 12, can be the same or different. It is advantageous to use a colored, UV-resistant plastic such as polyethylene for outer layer 11, whereas inner layer 12 can consist of uncolored plastic, such as polyethylene. Intermediate layer 13 consists of a foamable plastic such as a polyethylene into which advantageously a foam retardant has been incorporated, which ensures that intermediate layer 13 of wall 10 of preform 34 does not foam up at all right away or at least not to any significant extent.

A predetermined length of preform 34 is now extruded into open mold 20 and thus between the two mold halves 20a, 20b, as can be seen in FIG. 4. As this is being done, the four spreading elements 27 are surrounded by tube-like preform 34. As soon as preform 24 has reached the desired final position in mold 20, it is pinched by clamping elements 33, as can be seen in FIG. 6 of the drawing. As a result, the extruded length of preform 34 can no longer change. Now spreading elements 27 are moved back again into their starting position according to FIG. 3, although they remain in their upper position between the two mold halves 20a, 20b and thus within preform 34. As spreading elements 27 execute this movement, they expand preform 34, as can be seen in FIG. 6. During this operation, clamping elements 33 are lowered a predetermined amount into the position shown in FIG. 7. The degree of expansion is calculated so that mold core 21 located underneath preform 34 can now be raised by its drive 24 and thus introduced into preform 34. After mold core 21 has arrived in its upper end position according to FIG. 7, spreading elements 27 rest again against mold core 21 and form together with it the so-called inner mold body. Now mold 20 can be closed. For this purpose, the two mold halves 20a, 20b are first moved into the closed position shown in FIG. 8. Then the two upper parts 25 and the four side parts 26 are also moved into their closed positions, as can be derived from FIG. 9. As these movements are occurring, preform 34 is cut off from a slug 35 located between clamping elements 33. Now preform 34 is located entirely within a mold cavity, which has mold core 21 with spreading elements 27 as its inside boundary and mold halves 20a, 20b with upper parts 25 and side parts 26 as its outside boundary. Now the foaming process of the foamable intermediate layer 13 can take place or be initiated. As a result of this foaming process, outer layer 11 and inner layer 12, which consist of compact plastic, are brought into contact with the walls of the mold cavity. Inner layer 12 comes to rest against mold core 21 and spreading elements 27, whereas outer layer 11 comes to rest against mold halves 20a, 20b with upper parts 25 and side parts 26. A system designed in this way and a procedure such as that described guarantee that wall 10 of finished device 6 always has a precisely predetermined thickness. To facilitate and to accelerate the process by which outer layer 11 and inner layer 12 come to rest against the walls of the so-called mold cavity, it is possible to apply a vacuum to the mold cavity. For this purpose, appropriate and generally known vent openings can be incorporated into mold core 21 and mold halves 20a, 20b with upper parts 25 and side parts 26. By designing side parts 26 in the proper way, it is also possible for opening 14 to be produced at the same time that mold 20 is closed.

As soon as device 6 produced in this way from preform 34 has cooled off sufficiently—if necessary, mold core 21 and mold halves 20a, 20b with upper parts 25 and side parts 26 can be treated with a coolant—mold 20 can be opened and finished device 6 removed. First, upper parts 25 and side parts 26 are pivoted back into their starting positions shown in FIGS. 2 and 3. Then the two mold halves 20a, 20b are also moved back to their original positions according to FIG. 2. At this point, finished device 6 is merely sitting on mold core 21 and spreading elements 27. Now the lower edge of finished device 6 can be held firmly by means of, for example, a surrounding stop bar, and mold core 21 together with spreading elements 27 can be moved back into the lower starting position shown in FIG. 2. Device 6 is now completely free and can be removed from the system.

Figure 10B:
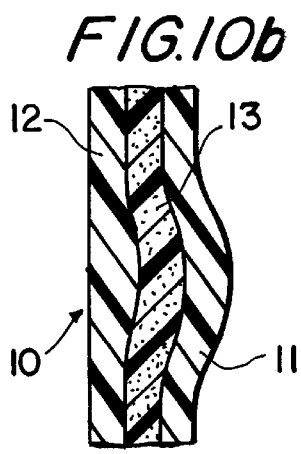
FIGS. 10b and 10c show the design of the wall of a tube-like preform with layers of different thickness.
Figure 10C:
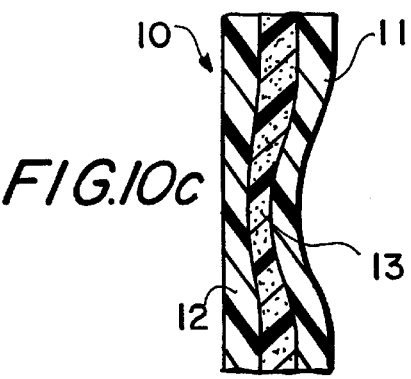
Figure 10D:
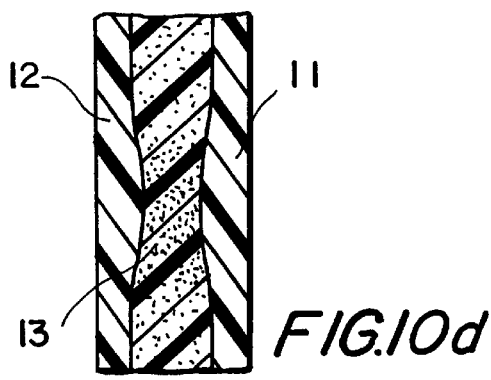
FIGS. 10d and 10e show the wall of a device made from the preform of FIGS. 10b and 10c.

To obtain a foamed intermediate layer 13 with different densities, it is possible to provide the individual layers 11, 12, 13 of wall 10 of preform 34 with different thicknesses during the extrusion process, as indicated in FIGS. 10*b* and 10*c*. FIG. 10*b* shows wall 10 of a tube-like preform 34, in which intermediate layer 13, outer layer 11, and inner layer 12 have been extruded more thickly over a predetermined portion of their length. The wall of finished device 1 then has the form shown in FIG. 10*d*. Here intermediate layer 13 has a constricted area where it is more highly compacted.

Figure 10E:
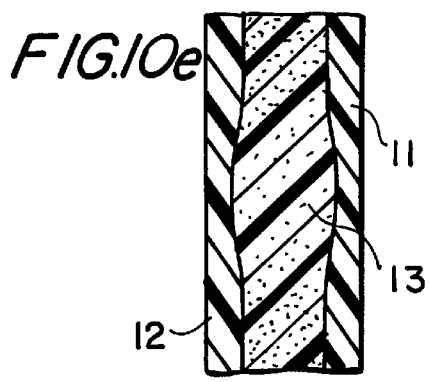

In contrast, FIG. 10*c* shows wall 10 of a tube-like preform 34 in which intermediate layer 13, outer layer 11, and inner layer 12 have been extruded more thinly over a predetermined portion of their length. This has the result that intermediate layer 13 can foam up to a greater degree in closed mold 20 for the same overall thickness of wall 10, as can be seen in FIG. 10*e*, which shows wall 10 of finished device 1.

Figure 10F:
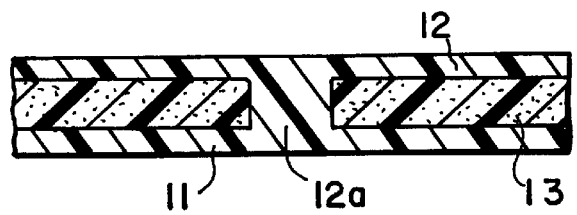
FIG. 10f shows a cross section through the wall of the device of FIG. 1 in the area of a view strip.

It is also possible, furthermore, to provide device 6 with a vertical viewing strip 12*a* in the area of its jacket body 8, as illustrated in FIG. 1. This can be done, for example, by extruding a narrow, longitudinal strip of translucent plastic along with the rest of the plastic during the extrusion of preform 34. If inner layer 12 consists of translucent plastic, that is, uncolored plastic, it is possible for this viewing strip 12*a* to consist of the same material as that of inner layer 12, as suggested in FIG. 10*f*. A viewing strip in jacket body 8 offers the possibility of seeing how full container 2 is. This, however, is based on the assumption that container 2 consists either of translucent plastic or also has a viewing strip. If the container has its own viewing strip, it must, of course, be aligned with the viewing strip of jacket body 8.

What is claimed is:

1. Device for protecting a large-volume container, containing liquid, slow-flowing, powdered, or granular materials, during storage and transport of the container, the device consisting of a pallet support body configured to support the container from underneath and a jacket body, which is connected to the pallet support body and surrounds sides of the container, wherein the support body (7) and the jacket body (8) are an integral unit consisting of a three-layer plastic wall (10), wherein the three-layer plastic wall consists of a compact outer layer (11), a compact inner layer (12), and a foamed intermediate layer (13).

2. Device according to claim 1, wherein the jacket body (8) has a vertical viewing strip (12*a*).

3. Device according to claim 2, wherein the inner layer (12) consists of translucent plastic, and the viewing strip (12*a*) consists of the material of the inner layer (12).

4. Device according to claim 1, wherein the outer layer (11) is made of a UV-resistant, colored plastic.

5. Device according to claim 1, wherein the inner layer (12) and the outer layer (11) have areas with different wall thicknesses, and the intermediate layer (13) differs in its density in these areas with different wall thickness.

6. Process for producing a device according to claim 1, comprising the steps of:

extruding a predetermined length of a tubular preform comprised of a three-layer wall of plastic into outer mold parts of an opened mold, wherein the three-layer wall consists of a compact outer layer, a compact inner layer, and a foamable intermediate layer;

positioning at least three vertical, rod-shaped spreading elements inside the tubular preform;

expanding the tubular preform by moving the at least three vertical, rod-shaped spreading elements in a radially outward direction relative to the tubular preform by a predetermined outward movement;

introducing a mold core from below into the expanded tubular preform;

closing the the opened mold and forming a mold cavity between the outer mold parts and the mold core so that the tubular preform is positioned in the mold cavity; and foaming the intermediate layer to bring the compact inner layer and the compact outer layer into contact with walls of the mold cavity for shaping the device.

7. Process according to claim 6, wherein the step of positioning comprises moving the at least three vertical, rod-shaped spreading elements from below into the extruded preform.

8. Process according to claim 6, wherein a vacuum is applied to the mold cavity via at least one of the mold and the mold core.

9. Process according to claim 6, wherein at least one of the mold core and the mold is treated with a coolant after the step of foaming.

10. Process according to claim 6, wherein the at least three vertical, rod-shaped spreading elements constitute part of the mold core when forming the mold cavity.

11. Process according to claim 6, wherein, in the step of extruding, the tubular preform is provided with a viewing strip.

* * * * *